United States Patent [19]

Johnson et al.

[11] 4,343,843

[45] Aug. 10, 1982

[54] FIBER REINFORCED EPOXY RESIN ARTICLE

[75] Inventors: Junior L. Johnson, Mabelvale; Leonard E. Pikey, Benton, both of Ark.

[73] Assignee: A. O. Smith-Inland, Inc., Milwaukee, Wis.

[21] Appl. No.: 181,970

[22] Filed: Aug. 28, 1980

[51] Int. Cl.³ ............................................. B65H 81/00
[52] U.S. Cl. .................... 428/36; 138/DIG. 2; 138/DIG. 7; 138/172; 138/174; 156/169; 156/170; 156/172; 264/137; 428/245; 428/271; 428/272; 428/273; 428/289; 428/290; 428/408; 428/413; 428/417; 428/418; 428/902; 525/529; 528/101; 528/110; 523/466
[58] Field of Search ............... 156/169, 170, 171, 172, 156/173, 174, 175; 264/137; 138/DIG. 2, DIG. 7, 172, 174; 260/37 EP; 428/36, 251, 268, 273, 285, 290, 417, 418, 408, 245, 271, 272, 289, 413, 902; 528/110, 101; 525/529

[56] References Cited

U.S. PATENT DOCUMENTS

| | | | |
|---|---|---|---|
| 2,575,558 | 11/1951 | Newey et al. | 156/330 |
| 2,829,124 | 4/1958 | Napravnik et al. | 156/59 |
| 2,847,395 | 8/1958 | Wear | 428/251 |
| 2,986,546 | 5/1961 | Naps | 260/35 |
| 3,239,598 | 3/1966 | Olson et al. | 174/126 SR |
| 3,281,493 | 10/1966 | Thornton et al. | 525/58 |
| 3,444,019 | 5/1969 | Van Leeuwen | 156/156 |
| 3,563,850 | 2/1971 | Stackhouse et al. | 428/413 |
| 3,733,228 | 5/1973 | Heidelberg | 156/172 |
| 3,733,228 | 5/1973 | Wesch | 156/172 |

*Primary Examiner*—James J. Bell
*Attorney, Agent, or Firm*—Andrus, Sceales, Starke & Sawall

[57] ABSTRACT

A fiber reinforced epoxy resin article in which a Lewis base is employed as the catalyst for the addition reaction of a phenolic or alcoholic hydroxyl group and the oxirane group of the epoxy resin. The resin system has improved flexibility and pot life and the cured article has improved chemical resistance.

10 Claims, No Drawings

FIBER REINFORCED EPOXY RESIN ARTICLE

BACKGROUND OF THE INVENTION

Epoxy resins are frequently used in the production of fiber reinforced plastic pipe. An epoxy resin will cure or crosslink by itself when heated, but the time and temperature required are impractical for commercial operations. To achieve practical results, curing agents and accelerators are used. The curing agent will crosslink with the epoxy resin to become a chemical part of the cured resin, while the accelerator will either promote the reaction of the epoxy resin and curing agent or will serve to catalyze the reaction of the epoxy resin itself.

It is well known to employ hydroxyl groups as curing agents for epoxy resins. However, this reaction is very slow and it has been customary to accelerate the action by using small amounts of an inorganic acid, such as phosphoric acid. The disadvantages of this type of acceleration is that it promotes an etherification reaction which takes place with the formation of water. While the formation of water may be of little consequence in a paint or coating application where the layers are thin, formation of the water during curing of a filament wound article, such as a pipe, results in the entrapment of water within the walls of the pipe and produces a serious reduction in the physical properties of the pipe.

It is also known, as disclosd in U.S. Pat. No. 2,575,558, to utilize a tertiary amine, such as triethylamine, as a curing agent for epoxy resins. Tertiary amines as curing agents are normally used in fairly high concentrations and it is assumed that the reaction is an epoxy-epoxy polymerization.

SUMMARY OF THE INVENTION

The invention is directed to a fiber reinforced epoxy resin article, such as a filament wound pipe, having improved physical properties and in particular having substantially improved chemical resistance. In accordance with the invention a Lewis base is employed as the catalyst for the addition reaction of a phenolic or alcoholic hydroxide and the oxirane groups in the epoxy resin. Water is not released during this reaction and thus the chemical properties of the cured epoxy resin article are substantially improved.

As a further advantage, the fiber reinforced resin article of the invention has greater flexibility than epoxy articles cured with the use of an amine curing agent. Resin systems, as used in the invention, are also less toxic than most amine cured epoxy resins.

Furthermore, the resin system of the invention has a longer pot life and lower viscosity which results in improved processing for the epoxy article.

Other advantages will appear in the course of the following description.

DESCRIPTION OF THE PREFERRED EMBODIMENT

The invention is directed to a fiber reinforced epoxy resin article, such as a pipe, fitting, vessel, or the like. The fiber reinforcement can take the form of superimposed layers of substantially continuous fibers, as in a filament wound pipe, or the fiber reinforcement can be in the form of haphazardly arranged fibers, such as matting, woven fabric, or sprayed fibers.

The fiber reinforcement can be mineral fibers, such as glass or asbestos; vegetable fibers, such as cotton; animal fibers, such as wool; metal fibers, such as steel or graphite; or synthetic fibers, such as nylon, Dacron, or the like.

In accordance with the invention, the cured epoxy resin is produced by the addition reaction of a phenolic or alcoholic hydroxide, or mixtures thereof, and the oxirane group of the epoxy resin, utilizing a Lewis base as a catalyst. From a chemical standpoint, any hydroxyl group is capable of reacting with the epoxy to provide the crosslinking reaction. From a practical standpoint, however, only those hydroxyl compounds that can serve as crosslinking agents are utilized. Thus, the hydroxyl compounds should be multi-functional, and examples of simple di-functional phenols that can be used are hydroquinone and resorcinol. The phenol-formaldehyde condensation products (phenolic resins) are preferred. Both resole and novolac types can be used.

Example of compounds having alcoholic hydroxyl groups that can be used are ethylene glycol, propylene glycol, 1,4butane diol, furfuryl alcohol, and the like.

The epoxy resin is a conventional type which can be prepared, as for example in U.S. Pat. No. 2,081,227 entitled Process For Manufacture of Glycidyl Ethers of Polyhydric Phenols.

The Lewis base which is used as the catalyst for the reaction is a compound with unshared electron pairs. The effectiveness of the compound of an accelerator or catalyst will depend on the availability of the unshared electron pair, i.e. the strength of the Lewis base. Tertiary amines are the preferred Lewis base and examples of tertiary amines which can be used are 1-methylimidazole, 2-ethylimidazole, 1-ethyl-2-methylimidazole, imidazole, benzyldimethylamine, 2,3,6-tris-(dimethylaminomethylphenol), and the like. Other compounds which can be utilized as the accelerator are heterocyclic nitrogen compounds, such as piperidine, and piperizine.

The practical ranges for the components are as follows in parts by weight:

| | |
|---|---|
| Epoxy Resin | 100 |
| Phenolic or Alcoholic Hydroxide | 2 50 |
| Lewis base accelerator | 0.1–5 |

The following examples illustrate the manner of carrying out the present invention.

EXAMPLE I

A glass fiber reinforced epoxy resin pipe was fabricated on a conventional filament winding machine with the pipe having an ID of 2.235 inches and average OD of 2.510 inches and an average wall thickness of 0.138 inch.

In fabricating the pipe, substantially continuous glass filaments were impregnated with an epoxy resin system having the following composition in parts by weight:

| | |
|---|---|
| Epoxy resin (DER 383, Dow Chemical Co.) | 100 |
| Methylon 75108 (mixture of allyl ethers of mono, di- and tri-methylol phenols, (General Electric Plastics) | 20 |
| 1-methylimidazole (BASF Wyandotte) | 1 |

After winding the resin impregnated glass rovings on a cylindrical mandrel in a number of superimposed layers to form the pipe, the pipe was cured by heating at 200° F. for ½ hour, followed by heating to 350° F. for ½ hour. After curing, the pipe was evaluated for physical and chemical properties.

The following Table is a comparison of the chemical properties of the pipe prepared in accordance with Example I above, with a conventional glass fiber reinforced epoxy resin system having the following formulation in parts by weight:

| Epoxy resin (DER 383) | 100 |
| --- | --- |
| p-p'-methylene dianiline (Curithane 103, Upjohn) | 28 |

TABLE I

| Treating Chemical | Temp. °F. | Pipe of Invention | | Conventional Pipe | |
| --- | --- | --- | --- | --- | --- |
| | | Appearance | % Stress Retentn. | Appearance | % Stress Retentn. |
| Hydrochloric Acid, 36.5% | 75 | A | 96 | A | 86 |
| Hydrochloric Acid, 10% | 150 | A | 115 | A, ID Dark | 87 |
| Sulfuric Acid, 20% | 180 | A | 103 | A, ID Dark | 53 |
| Sulfuric Acid, 50% | 150 | A | 102 | A, ID Dark | 84 |
| Acetic Acid, 75% | 120 | A | 105 | A | 85 |
| Ferric Chloride, 40% | 205 | A, ID Black | 101 | A | 96 |
| Benzene | 150 | A, ID Light | 110 | A | 89 |
| Sodium Hydroxide, 1% | 205 | A, ID Light | 109 | Blistering | 60 |
| Sodium Hydroxide, 10% | 180 | Minor Blistering | 78 | Blistering | 59 |
| Sodium Hydroxide, 50% | 180 | A | 116 | Blistering, Swelling | 72 |
| Tap Water | 205 | A | 99 | A | 61 |
| Phenol, 5% | 150 | A | 108 | A, ID Dark | 82 |
| Sodium Carbonate, 10% | 205 | A, ID Light | 120 | A | 68 |
| Sodium Carbonate, 50% | 205 | Minor Fiber Blooming | 113 | A | 84 |
| Ammonium Sulfate, 40% | 205 | A | 112 | A | 90 |

The above Table lists the various chemical treating solutions which were used in the tests, as well as the temperatures employed. The designation "A" under the heading "Appearance" indicated an acceptable appearance after treatment. The percent stress retention refers to hoop tensile strength of the pipe treated with the listed solutions, as compared with the hoop tensile strength of an untreated control sample after 12 months exposure to the listed solution.

From the above Table it can be seen that the pipes prepared in accordance with the invention have substantially improved stress retention after exposure to the chemical solutions than that of the conventional epoxy resin pipes. In addition, the pipes of the invention also showed an improvement in appearance over conventional pipes after the 12 month period of exposure.

EXAMPLE II

A glass reinforced epoxy resin pipe was prepared in accordance with the procedure of Example I but using the following resin system formulation in parts by weight:

| DER epoxy resin | 100 |
| --- | --- |
| Methylon 75108 | 5 |
| 2-methylimidazole | 2 |

The pipe was cured as set forth in Example I. The cured pipe had physical properties comparable to that of the conventional amine cured pipe, but had chemical resistance substantially improved over the conventional pipe.

EXAMPLE III

A glass reinforced epoxy resin pipe was prepared in accordance with the procedure of Example I but using the following resin system formulation in parts by weight:

| DER 383 epoxy resin | 100 |
| --- | --- |
| Phenol-formaldehyde (novolac resin) | 15 |
| Furfuryl alcohol | 5 |
| Benzyldimethylamine | 2 |

The pipe was cured under the conditions set forth in Example I and after curing, the physical properties were noted to be comparable to that of a conventional amine cured epoxy resin pipe, but the pipe had substantially improved chemical resistance over the conventional pipe.

Various modes of carrying out the invention are contemplated as being within the scope of the following claims particularly pointing out and distinctly claiming the subject matter which is regarded as the invention.

We claim:

1. A fiber reinforced epoxy resin article, comprising a cured epoxy resin system, and a plurality of fibers embedded in said resin system, said resin system being produced by reacting in the presence of a Lewis base, an epoxy resin with a compound which contains polyfunctional hydroxyl groups selected from the class consisting of phenolic hydroxyl groups, alcoholic hydroxyl groups and mixtures thereof, said resin system comprises 100 parts by weight of said epoxy resin, 2 to 15 parts by weight of said compound, and 0.1 to 5 parts by weight of said Lewis base.

2. The article of claim 1, wherein said fibers are glass fibers and said article is a tubular member.

3. The article of claim 1, wherein said Lewis base is a tertiary amine.

4. The article of claim 3, wherein said tertiary amine is selected from the group consisting of 1-methylimidazole, 2-ethylimidazole, 1-ethyl-2-methylimidazole, imidazole, benzyldimethylamine, 2,3,6-tris (dimethylaminomethylphenol), and the like.

5. The article of claim 1, wherein said compound is a phenol formaldehyde resin.

6. A method of making a fiber reinforced epoxy resin article, comprising the steps of impregnating a fibrous material with an uncured epoxy resin system having the following formulation in parts by weight:

| | |
|---|---|
| Epoxy resin | 100 |
| Hydroxyl compound | 2–50 |
| Lewis base | 0.1–5, | said hydroxyl compound containing groups selected from the class consisting of phenolic hydroxyl groups, alcoholic hydroxyl groups and mixtures thereof, forming the impregnated fibers into an article, and reacting said hydroxyl compound with said epoxy resin and catalyzing the reaction with said Lewis base to cure the resin, said reaction occurring without the production of water to thereby substantially improve the chemical resistance of the cured article.

7. The method of claim 6, wherein said hydroxyl compound is a phenol formaldehyde resin.

8. The method of claim 6, wherein said Lewis base is a tertiary amine selected from the group consisting of 1-methylimidazole, 2-ethylimidazole, 1-ethyl-2-methylimidazole, imidazole, benzyldimethylamine, 2,3,6-tris-(dimethylaminoethylphenol), and the like.

9. The method of claim 6, and including the step of winding the impregnated fibers, prior to curing the resin, in a helical pattern in a number of superimposed layers to produce a tubular article.

10. A fiber reinforced epoxy resin article, comprising a cured epoxy resin system, and a plurality of fibers embedded in said resin system, said resin system being produced by reacting in the presence of a Lewis base an epoxy resin with a compound containing polyfunctional hydroxyl groups and selected from the class consisting of phenolic hydroxyl groups, alcoholic hydroxyl groups and mixtures thereof, said resin system comprising 100 parts by weight of said epoxy resin, 2 to 15 parts by weight of said compound, and 0.1 to 5 parts by weight of said Lewis base, said cured resin system being substantially free of water to thereby improve the chemical resistance of the cured article.

* * * * *

UNITED STATES PATENT AND TRADEMARK OFFICE
CERTIFICATE OF CORRECTION

PATENT NO. : 4,343,843
DATED : August 10, 1982
INVENTOR(S) : JUNIOR L. JOHNSON and LEONARD E. PIKEY It is certified that error appears in the above-identified patent and that said Letters Patent is hereby corrected as shown below:

Col. 2, line 26, Cancel "of", second occurrence, and substitute therefor ---as---; Col. 6, line 3, CLAIM 8, Cancel 2,3,6-tris(dimethylaminiethylphenol) and substitute therefor ---2,3,6-tris(dimethylaminomethylphenol)---

Signed and Sealed this

Sixteenth Day of November 1982

[SEAL]

Attest:

GERALD J. MOSSINGHOFF

Attesting Officer    Commissioner of Patents and Trademarks